US012744054B2

(12) United States Patent
Ueda et al.

(10) Patent No.: US 12,744,054 B2
(45) Date of Patent: Sep. 22, 2026

(54) MAGNETIC DISK DEVICE AND METHOD

(71) Applicants: Kabushiki Kaisha Toshiba, Kanagawa (JP); Toshiba Electronic Devices & Storage Corporation, Kanagawa (JP)

(72) Inventors: Kazuyoshi Ueda, Yokohama Kanagawa (JP); Yasuhiro Ishii, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/304,407

(22) Filed: Aug. 19, 2025

(65) Prior Publication Data

US 2026/0245581 A1 Aug. 20, 2026

(30) Foreign Application Priority Data

Feb. 20, 2025 (JP) ................................ 2025-025662

(51) Int. Cl.
*G11B 5/09* (2006.01)
*G11B 19/04* (2006.01)

(52) U.S. Cl.
CPC .............. *G11B 5/09* (2013.01); *G11B 19/045* (2013.01)

(58) Field of Classification Search
None
See application file for complete search history.

(56) References Cited

U.S. PATENT DOCUMENTS 5,831,782 A * 11/1998 Kohno .................. G11B 19/20
7,774,539 B2 8/2010 Mettler et al.
8,345,370 B2 1/2013 Inoue
8,699,185 B1 4/2014 Teh et al.
8,861,109 B1 * 10/2014 Hwang .................. G11B 5/02 360/31
8,879,183 B1 11/2014 Weikal et al.
9,087,540 B1 * 7/2015 Lee ..................... G11B 19/045
9,099,157 B1 * 8/2015 Hwang ............ G11B 20/10453
9,111,578 B1 * 8/2015 Hassel ............... G11B 20/1217
9,672,851 B1 * 6/2017 Gao ...................... G11B 5/012
11,017,804 B1 5/2021 Tomoda et al.
11,657,847 B1 * 5/2023 Passioukov ........ G11B 20/1217 360/48

(Continued)

FOREIGN PATENT DOCUMENTS

JP 2010-152988 A 7/2010
JP 2021-111426 A 8/2021
JP 2023-025543 A 2/2023

*Primary Examiner* — Peter Vincent Agustin

(74) *Attorney, Agent, or Firm* — Knobbe, Martens, Olson & Bear, LLP

(57) ABSTRACT

According to an embodiment, a magnetic disk device includes a controller that writes data in second tracks with an SMR scheme. The second tracks are continuous in the radial direction of a magnetic disk. The controller calculates a degree of influence of adjacent track interference (ATI) accumulated in first data being data written in the second tracks. The controller executes a first operation in accordance with the degree influence of ATI. The first operation is an operation of rewriting data written in third tracks located on the outermost diameter side or the innermost diameter side among the second tracks, and refraining from rewriting data written in the other tracks.

18 Claims, 9 Drawing Sheets

(56) References Cited

U.S. PATENT DOCUMENTS

| | | | | |
|---|---|---|---|---|
| 12,027,180 | B1 * | 7/2024 | Uchida | G11B 5/59655 |
| 2004/0174627 | A1 * | 9/2004 | Kim | G11B 27/36 |
| 2008/0174905 | A1 * | 7/2008 | Ueda | G11B 19/045 360/77.04 |
| 2012/0162806 | A1 * | 6/2012 | Champion | G11B 5/5582 |
| 2016/0148630 | A1 * | 5/2016 | Rausch | G11B 5/09 360/77.02 |
| 2023/0046510 | A1 | 2/2023 | Fujiwara | |
| 2023/0306991 | A1 * | 9/2023 | Maruyama | G11B 5/59605 |

* cited by examiner

FIG.4

GUARD TRACK
140
130
BAND AREA
GUARD TRACK
140
...
GUARD TRACK
140
130
BAND AREA
GUARD TRACK
140
130
BAND AREA
GUARD TRACK
140
120
MEDIA CACHE AREA
INNER DIAMETER SIDE
RADIAL DIRECTION
OUTER DIAMETER SIDE

FIG.6

| BAND AREA | OUTER DIAMETER SIDE ATI COUNT ($Cn_{OD}$) | INNER DIAMETER SIDE ATI COUNT ($Cn_{ID}$) |
|---|---|---|
| #0 | 0 | 20 |
| #1 | 15 | 15 |
| ⋮ | ⋮ | ⋮ |
| #N | 40 | 15 |

OUTER DIAMETER SIDE
RADIAL DIRECTION
INNER DIAMETER SIDE
140
140
140
(A)
BAND AREA #1
BAND AREA #2
140
140
140
(B)
BAND AREA #1
PARTIAL AREA #2-1 ($Cn_{OD} > Th_{ATI}$)
PARTIAL AREA #2-2 ($Cn_{ID} \leq Th_{ATI}$)
WRITE-INHIBITED TRACK
140
150
140
140
(C)
BAND AREA #1
PARTIAL AREA #2-1 ($Cn_{OD} > Th_{ATI}$)
PARTIAL AREA #2-2 ($Cn_{ID} \leq Th_{ATI}$)
130a
WRITE-INHIBITED TRACK
140
150
140-1
140
(D)
BAND AREA #1
BAND AREA #2-1
BAND AREA #2-2
130b

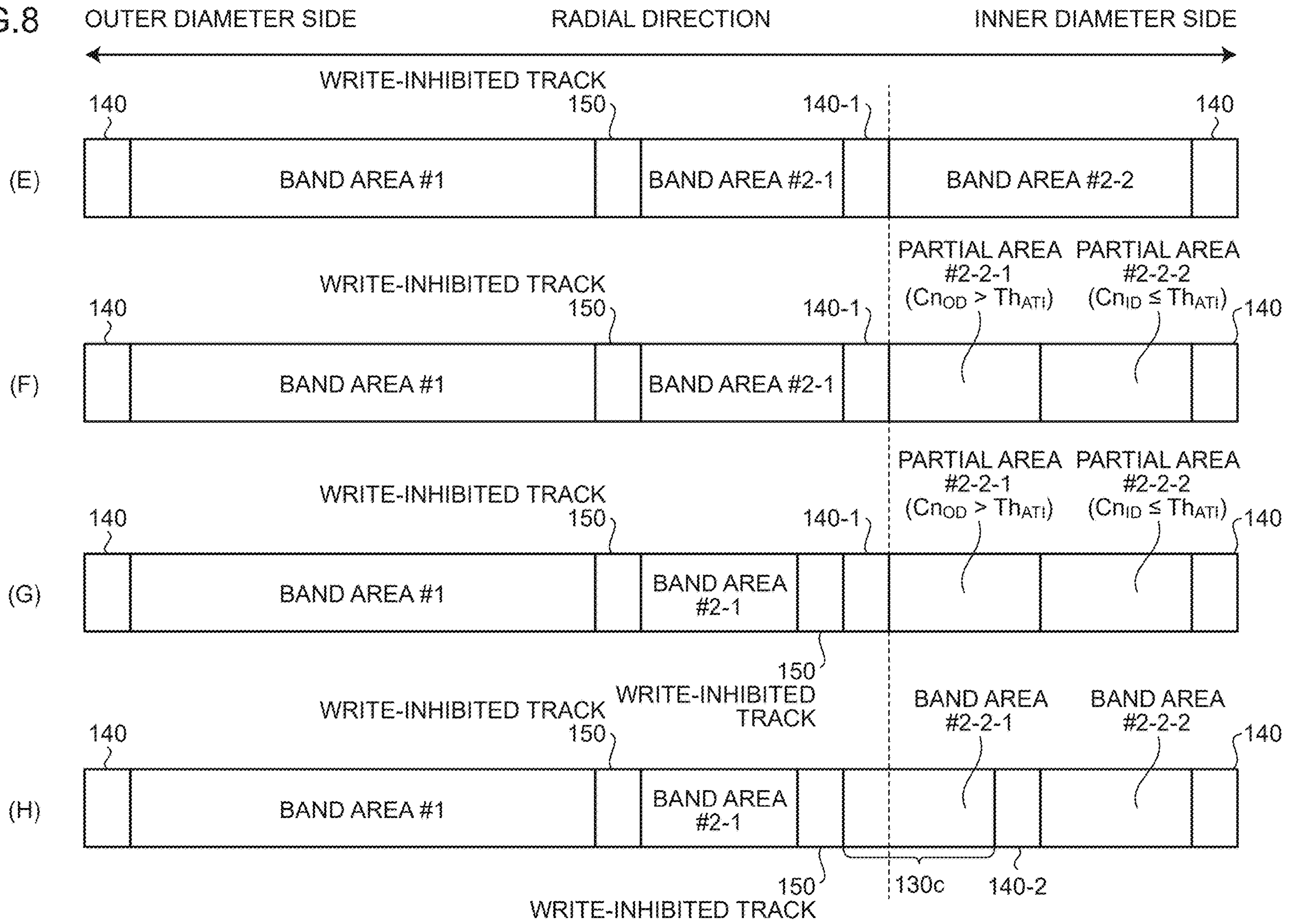

FIG.8
OUTER DIAMETER SIDE
RADIAL DIRECTION
INNER DIAMETER SIDE
(E)
WRITE-INHIBITED TRACK
140
150
140-1
140
BAND AREA #1
BAND AREA #2-1
BAND AREA #2-2
(F)
PARTIAL AREA #2-2-1 ($Cn_{OD} > Th_{ATI}$)
PARTIAL AREA #2-2-2 ($Cn_{ID} \leq Th_{ATI}$)
WRITE-INHIBITED TRACK
140
150
140-1
140
BAND AREA #1
BAND AREA #2-1
(G)
PARTIAL AREA #2-2-1 ($Cn_{OD} > Th_{ATI}$)
PARTIAL AREA #2-2-2 ($Cn_{ID} \leq Th_{ATI}$)
WRITE-INHIBITED TRACK
140
150
140-1
140
BAND AREA #1
BAND AREA #2-1
150
WRITE-INHIBITED TRACK
(H)
WRITE-INHIBITED TRACK
BAND AREA #2-2-1
BAND AREA #2-2-2
140
150
140
BAND AREA #1
BAND AREA #2-1
150
130c
140-2
WRITE-INHIBITED TRACK

FIG.9

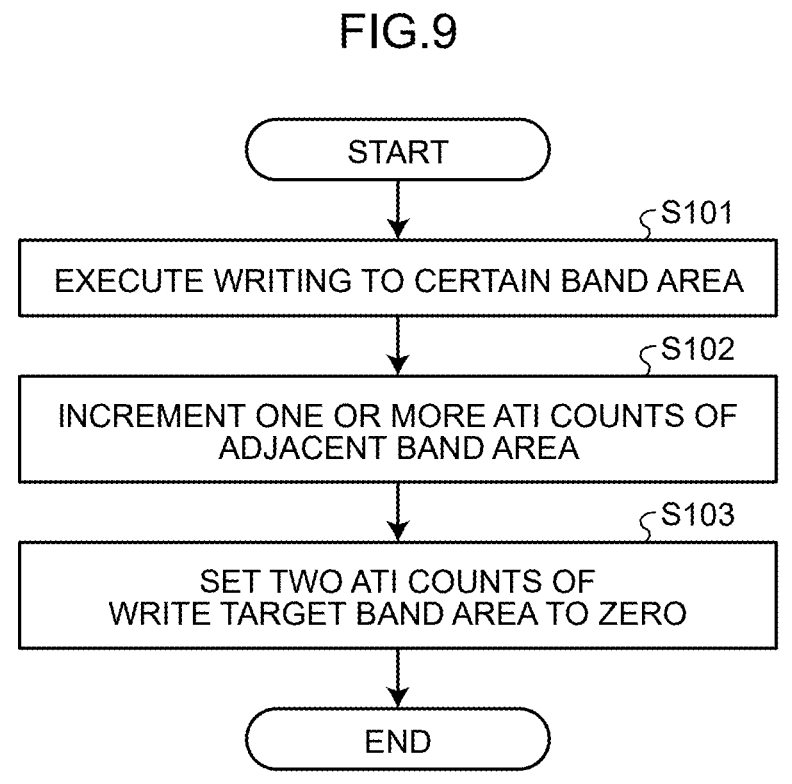

START

S101
EXECUTE WRITING TO CERTAIN BAND AREA

S102
INCREMENT ONE OR MORE ATI COUNTS OF ADJACENT BAND AREA

S103
SET TWO ATI COUNTS OF WRITE TARGET BAND AREA TO ZERO

END

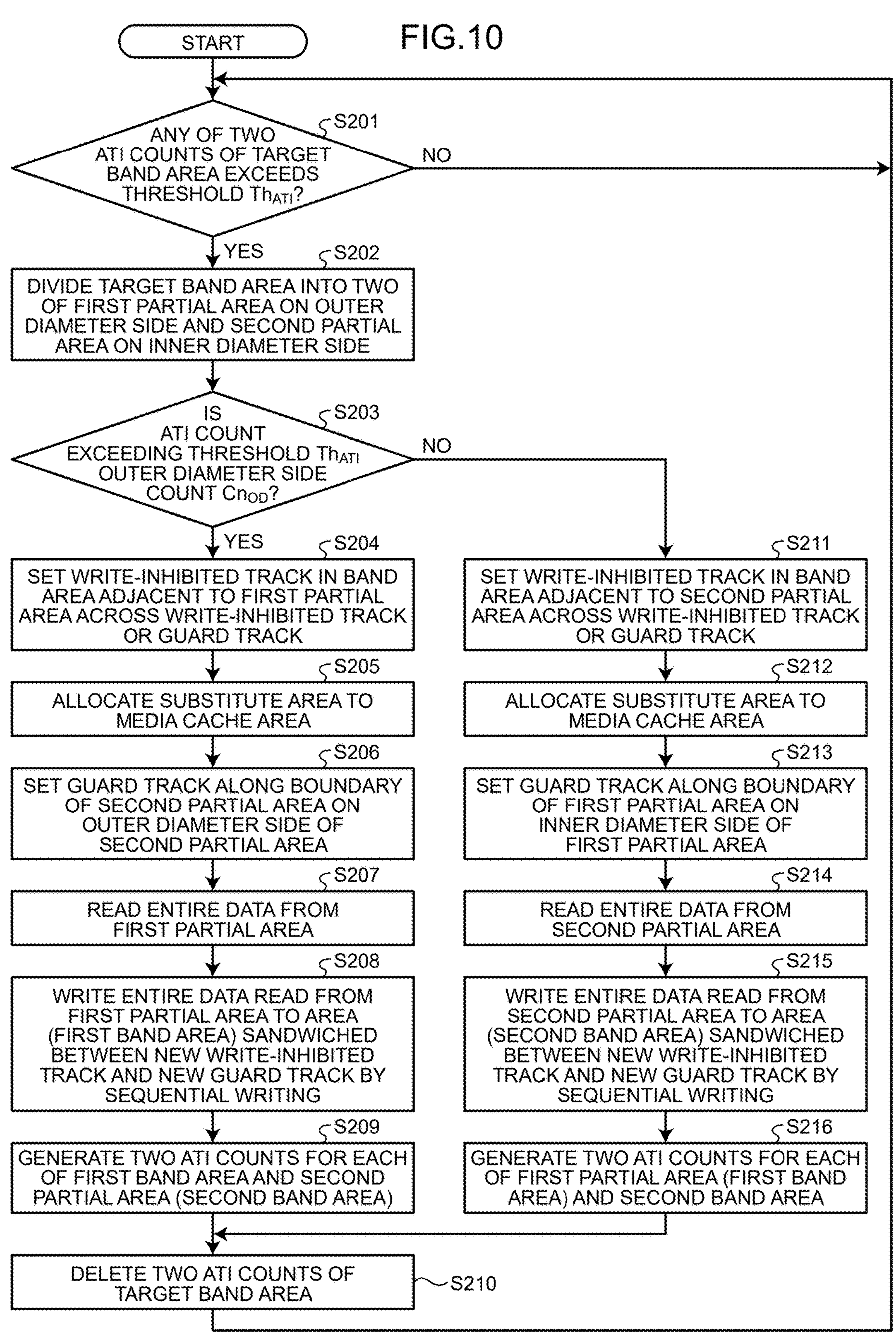
FIG.10
START
S201
ANY OF TWO ATI COUNTS OF TARGET BAND AREA EXCEEDS THRESHOLD $Th_{ATI}$?
NO
YES
S202
DIVIDE TARGET BAND AREA INTO TWO OF FIRST PARTIAL AREA ON OUTER DIAMETER SIDE AND SECOND PARTIAL AREA ON INNER DIAMETER SIDE
S203
IS ATI COUNT EXCEEDING THRESHOLD $Th_{ATI}$ OUTER DIAMETER SIDE COUNT $Cn_{OD}$?
NO
YES
S204
SET WRITE-INHIBITED TRACK IN BAND AREA ADJACENT TO FIRST PARTIAL AREA ACROSS WRITE-INHIBITED TRACK OR GUARD TRACK
S205
ALLOCATE SUBSTITUTE AREA TO MEDIA CACHE AREA
S206
SET GUARD TRACK ALONG BOUNDARY OF SECOND PARTIAL AREA ON OUTER DIAMETER SIDE OF SECOND PARTIAL AREA
S207
READ ENTIRE DATA FROM FIRST PARTIAL AREA
S208
WRITE ENTIRE DATA READ FROM FIRST PARTIAL AREA TO AREA (FIRST BAND AREA) SANDWICHED BETWEEN NEW WRITE-INHIBITED TRACK AND NEW GUARD TRACK BY SEQUENTIAL WRITING
S209
GENERATE TWO ATI COUNTS FOR EACH OF FIRST BAND AREA AND SECOND PARTIAL AREA (SECOND BAND AREA)
S211
SET WRITE-INHIBITED TRACK IN BAND AREA ADJACENT TO SECOND PARTIAL AREA ACROSS WRITE-INHIBITED TRACK OR GUARD TRACK
S212
ALLOCATE SUBSTITUTE AREA TO MEDIA CACHE AREA
S213
SET GUARD TRACK ALONG BOUNDARY OF FIRST PARTIAL AREA ON INNER DIAMETER SIDE OF FIRST PARTIAL AREA
S214
READ ENTIRE DATA FROM SECOND PARTIAL AREA
S215
WRITE ENTIRE DATA READ FROM SECOND PARTIAL AREA TO AREA (SECOND BAND AREA) SANDWICHED BETWEEN NEW WRITE-INHIBITED TRACK AND NEW GUARD TRACK BY SEQUENTIAL WRITING
S216
GENERATE TWO ATI COUNTS FOR EACH OF FIRST PARTIAL AREA (FIRST BAND AREA) AND SECOND BAND AREA
DELETE TWO ATI COUNTS OF TARGET BAND AREA
S210

MAGNETIC DISK DEVICE AND METHOD

CROSS-REFERENCE TO RELATED APPLICATIONS

This application is based upon and claims the benefit of priority from Japanese Patent Application No. 2025-025662, filed on Feb. 20, 2025; the entire contents of which are incorporated herein by reference.

FIELD

Embodiments described herein relate generally to a magnetic disk device and a method.

BACKGROUND

Adjacent track interference (ATI) has been known as one of influences on data of an adjacent track of a target track of data writing at the time of writing on a magnetic disk. The influence of ATI received by data of an adjacent track is accumulated in accordance with the number of times of writing for one track, and thereby the data of the adjacent track becomes difficult to read. Therefore, rewriting of the entire data is executed for the adjacent track before becoming difficult to read the data of the adjacent track. Such data rewriting according to ATI is also referred to as an ATI refresh operation.

In addition, in magnetic disk devices, a recording scheme called shingled magnetic recording (SMR) is conventionally known. According to the SMR scheme, in general, sequential writing is performed in units of storage areas each constituted by a plurality of tracks continuous in the radial direction.

BRIEF DESCRIPTION OF THE DRAWINGS

FIG. 4 is a view illustrating an example of a plurality of band areas provided in the magnetic disk according to the embodiment;

FIG. 6 is a view illustrating an example of a method of managing an ATI count by a controller according to the embodiment;

FIG. 8 is another view for describing the ATI refresh operation according to the embodiment;

FIG. 9 is a view illustrating an example of a write operation according to the embodiment; and FIG. 10 is a view illustrating an example of the ATI refresh operation according to the embodiment.

DETAILED DESCRIPTION

According to the present embodiment, a magnetic disk device includes a magnetic disk on which first tracks are provided, a magnetic head, and a controller. The controller is configured to write data in second tracks with a shingled magnetic recording (SMR) scheme by using the magnetic head. The second tracks are tracks continuous in a radial direction among the first tracks. The controller is configured to calculate a degree of influence of adjacent track interference (ATI) accumulated in first data being the data written in the second tracks. The controller is configured to execute a first operation in accordance with the degree of influence of ATI. The first operation includes rewriting second data out of the first data. The second data is written in third tracks among the second tracks. The third tracks are continuous in the radial direction and located on an outermost diameter side or an innermost diameter side of the second tracks. The first operation includes refraining from rewriting data out of the first data written in fourth tracks. The fourth tracks are tracks continuous in the radial direction and are all tracks other than the third tracks among the second tracks.

Hereinafter, the magnetic disk device and a method according to embodiments will be described in detail with reference to the attached drawings. Note that the present invention is not limited to the embodiments.

Embodiment

Figure 1:
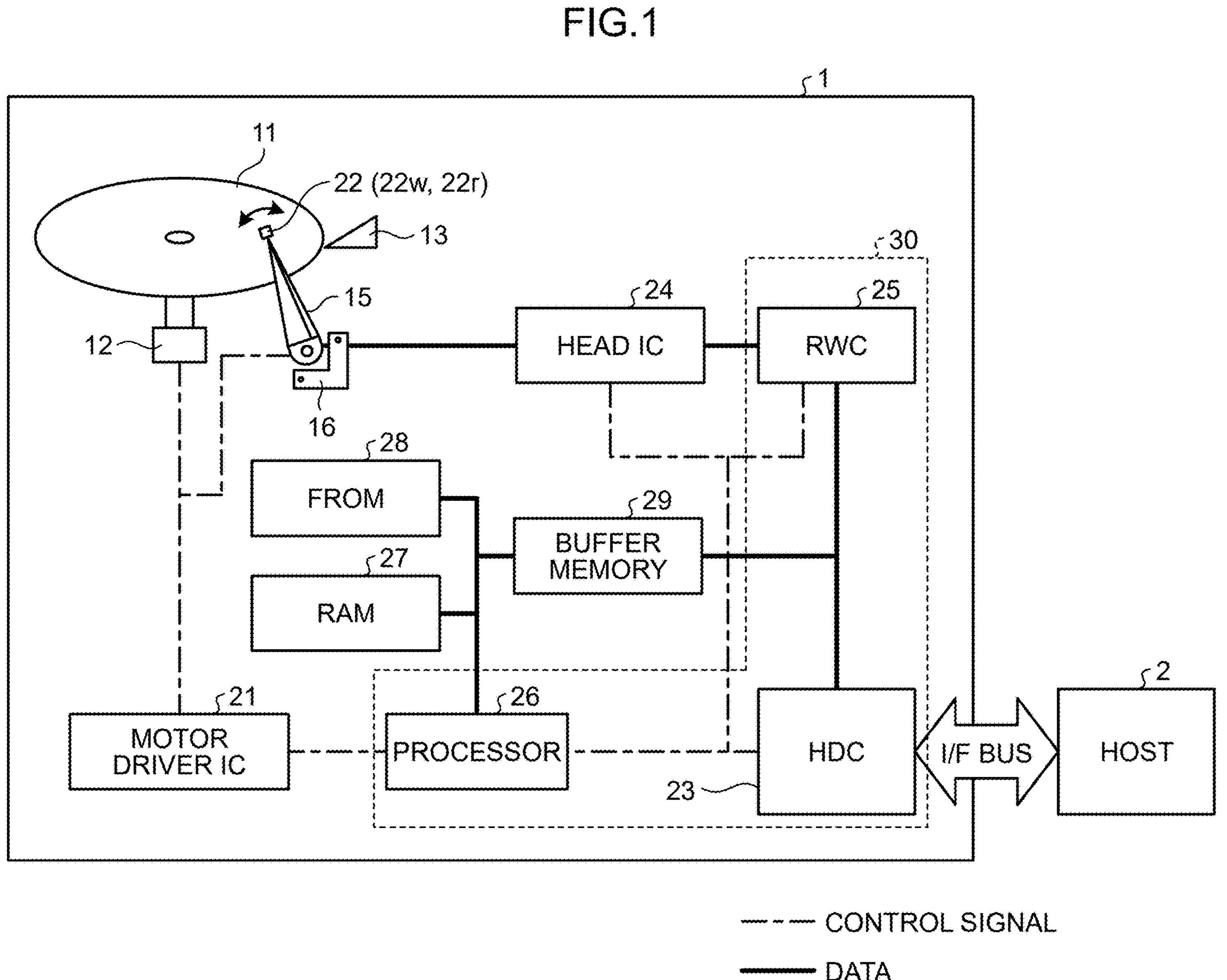
FIG. 1 is a diagram illustrating an example of a configuration of a magnetic disk device according to an embodiment.

FIG. 1 is a diagram illustrating an example of a configuration of a magnetic disk device 1 according to an embodiment.

The magnetic disk device 1 is connected to a host 2. The magnetic disk device 1 can receive access commands such as a write command and a read command from the host 2.

The access command includes a logical address. The magnetic disk device 1 provides a logical address space to the host 2. The logical address indicates a position in the address space. The host 2 designates the position where data is written or the position where data is read by using the logical address. Note that the logical address is denoted as a logical block address (LBA).

The magnetic disk device 1 includes a magnetic disk 11 on which a recording surface is formed. The magnetic disk device 1 writes data on the magnetic disk 11 and reads data from the magnetic disk 11 (more precisely, the recording surface of the magnetic disk 11) in response to the access commands. Note that the magnetic disk device 1 may include a plurality of the magnetic disks 11, whereas, in the present embodiment, the magnetic disk device 1 is assumed to include one magnetic disk 11 in order to simplify description and illustrations.

The writing and reading of data are performed via the magnetic head 22. Specifically, the magnetic disk device 1 includes a spindle motor 12, a motor driver integrated circuit (IC) 21, a magnetic head 22, an actuator arm 15, a voice coil motor (VCM) 16, a ramp 13, a head IC 24, a read/write channel (RWC) 25, a RAM 27, a flash read only memory (FROM) 28, a buffer memory 29, a hard disk controller (HDC) 23, and a processor 26, in addition to the magnetic disk 11.

The magnetic disk 11 is rotated at a predetermined rotational speed by the spindle motor 12 provided on a spindle of the magnetic disk 11. The spindle motor 12 is driven by the motor driver IC 21.

The motor driver IC 21 controls the rotation of the spindle motor 12 and the rotation of the VCM 16.

The magnetic head 22 writes data and reads data on and from the magnetic disk 11 by a write element 22*w* and a read element 22*r* provided therein. In addition, the magnetic head 22 is attached to a distal end of the actuator arm 15. The magnetic head 22 is moved in the radial direction of the magnetic disk 11 by the VCM 16 driven by the motor driver IC 21.

When the rotation of the magnetic disk 11 is stopped or the like, the magnetic head 22 is moved onto the ramp 13. The ramp 13 is configured to hold the magnetic head 22 at a position spaced from the magnetic disk 11.

The head IC 24 amplifies a signal read by the magnetic head 22 from the magnetic disk 11 and outputs the amplified signal to be supplied to the RWC 25 during read. In addition, the head IC 24 amplifies a signal corresponding to write target data supplied from the RWC 25 and supplies the amplified signal to the magnetic head 22.

The HDC 23 performs control of data transmission and reception performed with the host 2 via an I/F bus, control of the buffer memory 29, error correction processing of read data, and the like.

The buffer memory 29 is used as a buffer of data to be transmitted to and received from the host 2. For example, the buffer memory 29 is used for temporarily storing the data written on the magnetic disk 11 or the data read from the magnetic disk 11.

The buffer memory 29 is configured by, for example, a volatile memory that can operate at high speed. A type of the memory constituting the buffer memory 29 is not limited to a specific type. For example, the buffer memory 29 can be configured by a dynamic random access memory (DRAM), a static random access memory (SRAM), or a combination thereof.

The RWC 25 modulates write target data to be supplied from the HDC 23 and supplies the modulated data to the head IC 24. In addition, the RWC 25 demodulates a signal read from the magnetic disk 11 and supplied from the head IC 24 and outputs the demodulated signal as digital data to the HDC 23.

The processor 26 is, for example, a central processing unit (CPU). The RAM 27, the flash read only memory (FROM) 28, and the buffer memory 29 are connected to the processor 26.

The FROM 28 is a nonvolatile memory. Firmware (program data) and various operation parameters are stored in the FROM 28. Note that the firmware may be stored on the magnetic disk 11.

The RAM 27 is configured by, for example, a DRAM, an SRAM, or a combination thereof. The RAM 27 is used as an operation memory by the processor 26. The RAM 27 is used as an area in which firmware is loaded and an area in which various types of management data are held.

The processor 26 performs overall control of the magnetic disk device 1 in accordance with the firmware stored in the FROM 28 or the magnetic disk 11. For example, the processor 26 loads the firmware from the FROM 28 or the magnetic disk 11 into the RAM 27, and executes control of the motor driver IC 21, the head IC 24, the RWC 25, the HDC 23, and the like in accordance with the loaded firmware.

Note that the configuration including the RWC 25, the processor 26, and the HDC 23 can also be regarded as the controller 30. The controller 30 can be configured as a system-on-a-chip (SoC). The controller 30 is not necessarily configured as the SoC. The controller 30 may further include another element (for example, the RAM 27, the FROM 28, the buffer memory 29, the RWC 25, or the like).

Figure 2:
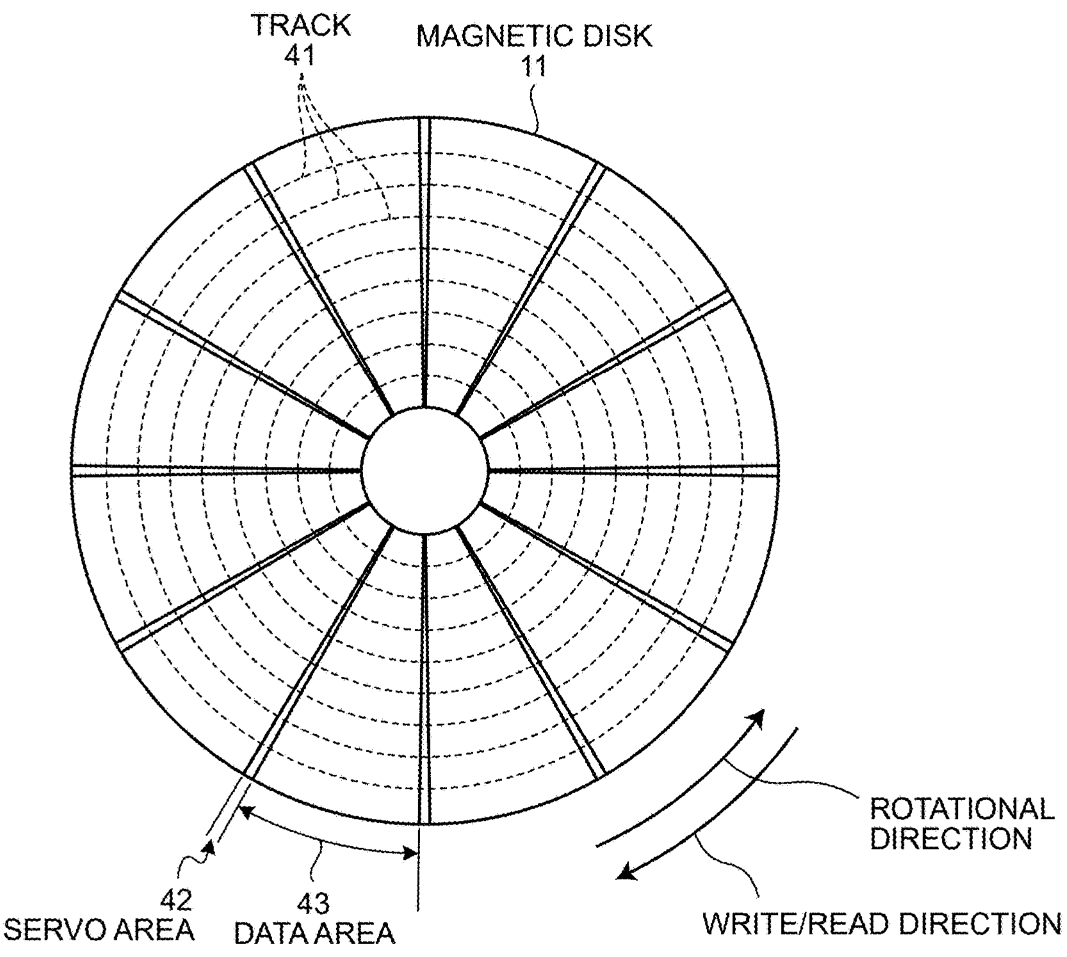
FIG. 2 is a view illustrating an example of a configuration of a magnetic disk according to the embodiment.

FIG. 2 is a view illustrating an example of a configuration of the magnetic disk 11 according to the embodiment. The drawing illustrates an example of a rotational direction of the magnetic disk 11. The magnetic head 22 moves relative to the magnetic disk 11 by the rotation of the magnetic disk 11. Therefore, a write/read direction, that is, a direction in which data is written or read by the magnetic head 22 in the circumferential direction is opposite to the rotational direction of the magnetic disk 11.

Servo information is written on the magnetic disk 11 in a manufacturing process, for example, by a servo writer or self-servo write (SSW). FIG. 2 illustrates servo areas 42 arranged radially as an example of the arrangement of servo areas in which the servo information is written. Each of data areas 43 in which data can be written is provided between the servo areas 42.

In the radial direction of the magnetic disk 11, concentric tracks 41 are set based on the servo information. In the data areas 43 provided along the tracks 41, data sectors in which data is to be written are arranged.

As a recording scheme of a magnetic disk device, a scheme called SMR and a scheme called conventional magnetic recording (CMR) are known. The SMR scheme is applied to the magnetic disk device 1 according to the embodiment.

Figure 3:
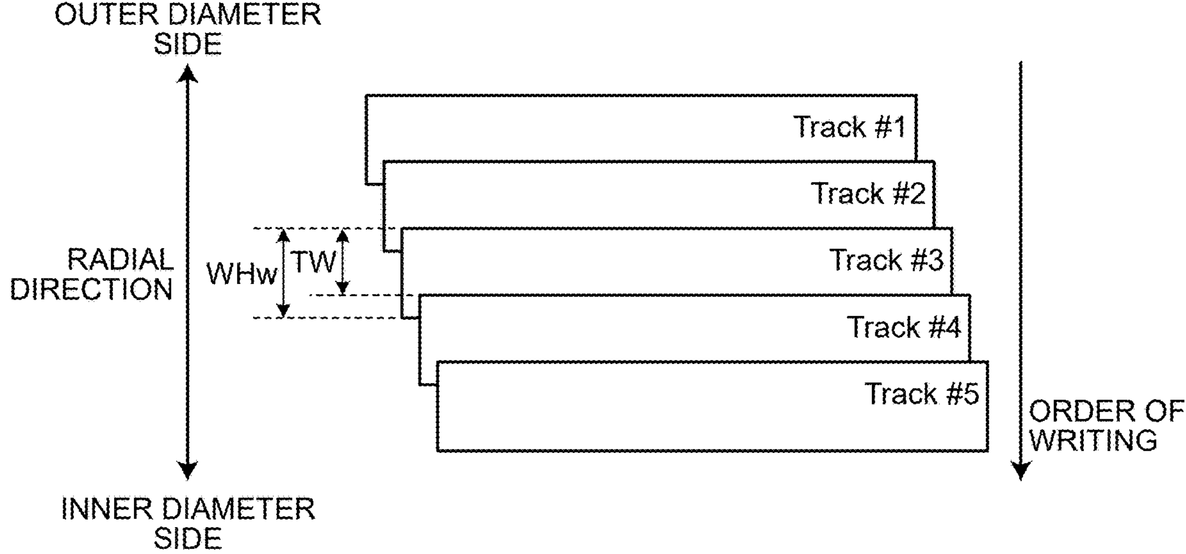
FIG. 3 is a view for describing an SMR scheme applied to the magnetic disk device according to the embodiment.

FIG. 3 is a view for describing the SMR scheme applied to the magnetic disk device 1 according to the embodiment.

In the SMR scheme, when writing of data (denoted as first data) of a certain track 41 is executed and then writing of data (denoted as second data) of another track 41 adjacent to the track 41 in the radial direction is executed, the respective tracks 41 are arranged such that the second data overlaps with part of the first data. Thus, according to the SMR scheme, data of one track 41 between two tracks 41 adjacent to each other in the radial direction of the magnetic disk 11 is written so as to overlap with part of data of the other track between the two tracks 41.

For example, data of a track #2 is written so as to overlap with part of already written data of a track #1. In addition, data of a track #3 is written so as to overlap with part of the already written data of the track #2. Thus, according to the SMR scheme, the overlapping of data of one track with part of already written data of an adjacent track is repeated.

With such repetition, each track width TW is narrowed as compared with a width (WHw) of the write element 22*w*, and the recording density can be improved.

However, according to SMR scheme, when some pieces of data corresponding to plural tracks is updated, data of a track adjacent to the updated data is destroyed. This is because the track width TW is narrower than the width WHw of the write element 22*w*. In order to prevent the destruction of data, the data corresponding to the plural tracks including the part of data is updated in a batch. An area of the plural tracks to be updated in a batch is referred to as a band area.

In addition, according to the SMR scheme, writing can be executed on the tracks 41 in one band area only in a preset direction from one of an end on the outer diameter side and an end on the inner diameter side of the magnetic disk to the other. Such a write scheme in which writing in a unit of the track 41 for one band area can be executed only in one direction from the outer diameter side to the inner diameter side or from the inner diameter side to the outer diameter side is denoted as sequential writing.

In the example illustrated in FIG. 3, a direction from the outer diameter side to the inner diameter side is set as a direction of the sequential writing. The direction of the sequential writing is not limited thereto. A direction from the inner diameter side to the outer diameter side may be set as the direction of the sequential writing. In addition, the direction of the sequential writing may be set individually for each of the band areas. In the present specification, as an example, it is assumed that the direction from the outer diameter side to the inner diameter side is set as the direction of the sequential writing in each band area.

Figure 4:
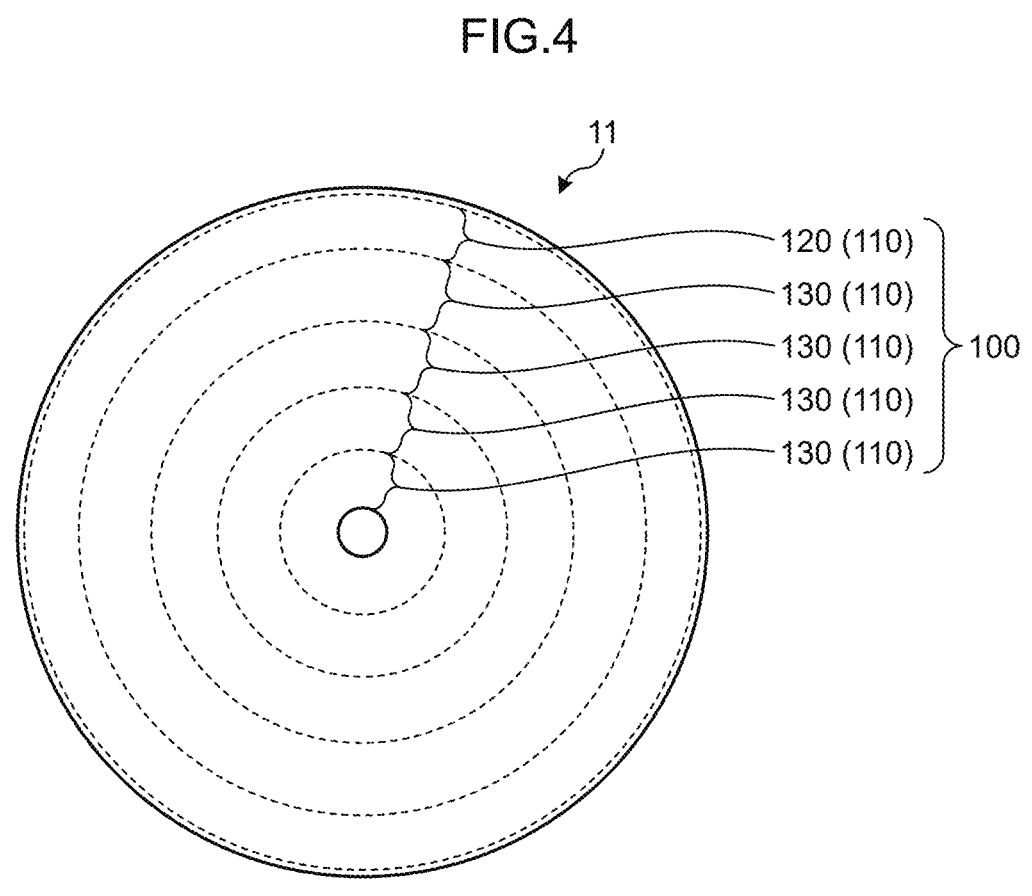
Figure 5:
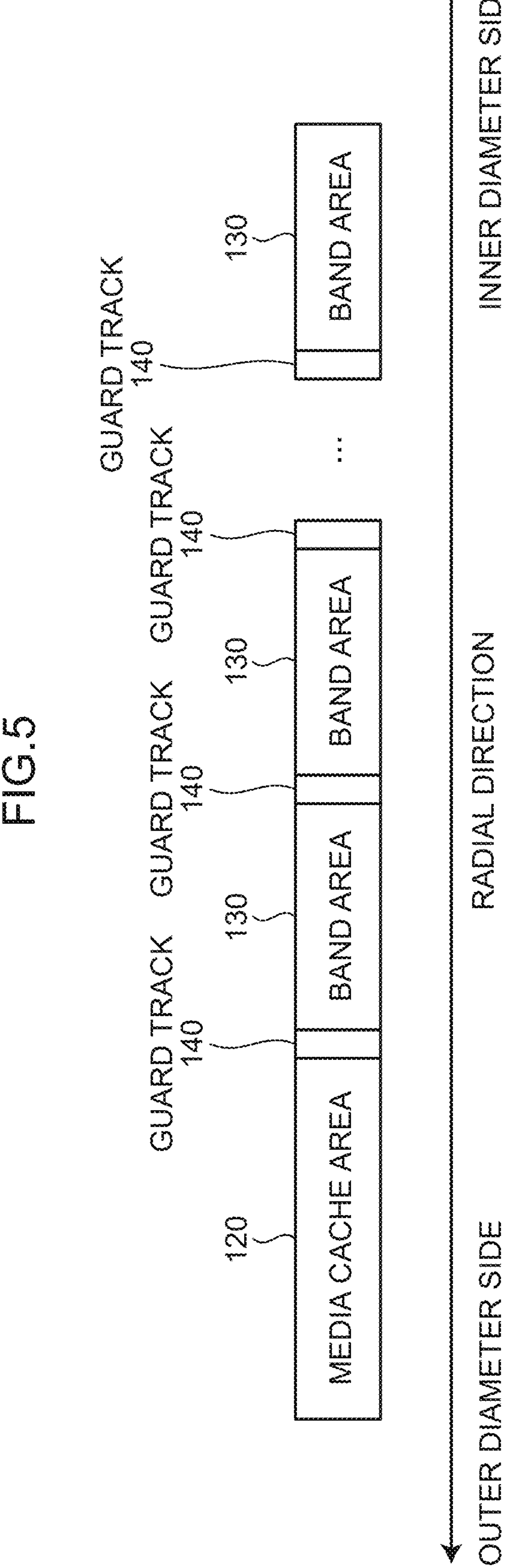
FIG. 5 is a view illustrating an example of the plurality of band areas provided in the magnetic disk according to the embodiment.

FIGS. 4 and 5 are views illustrating examples of a plurality of band areas provided in the magnetic disk 11 according to the embodiment.

A recording surface 100 of the magnetic disk 11, namely, an area in which the tracks 41 can be arranged, is divided into a plurality of storage areas 110 in the radial direction. The storage areas 110 include one media cache area 120 and a plurality of band areas 130. The band areas 130 are mapped with LBA ranges, which are mutually different ranges, respectively. Therefore, the position of each sector in each of the band areas 130 can be designated by an LBA.

Between the storage areas 110, the track 41 called a guard track 140 onto which no LBA is mapped is provided. Each of the guard tracks 140 is constituted by one track 41. Since the guard track 140 is provided at a boundary of each of the band areas 130, the sequential writing can be individually performed on each of the band areas 130 without destroying data of the adjacent band area 130.

The storage area 110 provided on the outermost diameter side in the radial direction in the recording surface 100 is set as the media cache area 120. The media cache area 120 is a storage area used as a place in which data is temporarily stored. Note that the position of the media cache area 120 is not limited to the outermost diameter side. In addition, two or more media cache areas 120 may be provided in the recording surface. In the media cache area 120, data can be written with the CMR scheme.

According to the CMR scheme, each of the tracks 41 is arranged so as not to overlap with another track 41 adjacent in the radial direction. In other words, the CMR scheme is a scheme in which pieces of data of two tracks adjacent to each other in the radial direction of the magnetic disk 11 are written so as not to overlap with each other. According to the CMR scheme, a width of each of the tracks 41 is the same as the width (WHw) of the write element 22*w*, and thus, data at any position can be updated. Therefore, according to the CMR scheme, random access is possible although the recording density is lower than that of the SMR scheme.

Each of the band areas 130 is provided with a plurality of the tracks 41. In each of the band areas 130, data is written in all the tracks 41 with the SMR scheme. In a case where writing is performed on the tracks 41 in one band area 130 with the SMR scheme, the track 41, which is located at one end of the tracks 41 in the radial direction and is the first in the order of writing, is denoted as a head track of the band area 130. The track 41, which is located at the other end of the tracks 41 in the radial direction and is the last in the order of writing, is denoted as an end track of the band area 130. In the example illustrated in the present specification, since the direction from the outer diameter side to the inner diameter side is set as the direction of the sequential writing, the track 41 on the outermost diameter side among the tracks 41 in each of the band areas 130 is the head track, and the track 41 on the innermost diameter side among the tracks 41 in each of the band areas 130 is the end track.

As described above, when data is written in one track 41 (denoted as a write target track 41), data of the track 41 adjacent to the write target track 41 is affected by ATI. The influence of ATI on data of each of the tracks 41 is accumulated in accordance with the number of times of writing in the adjacent track 41. When the influence of ATI on data of one track 41 is extremely large, it is difficult to read the data of the track 41. The controller 30 executes an ATI refresh operation before data of each of the tracks 41 becomes difficult to read due to the influence of ATI.

In the SMR scheme, the sequential writing is executed in units of the band areas 130. Therefore, the controller 30 monitors a degree of influence of ATI accumulated in data in units of the band areas 130. The degree of influence of ATI accumulated in the data of each of the band areas 130 is calculated by using a counter that is incremented in response to writing in the adjacent band area 130. A value of the counter is denoted as an ATI count. The ATI count is numerical information corresponding to the degree of influence of ATI accumulated in data written in the band area 130.

The controller 30 executes the ATI refresh operation when the ATI count exceeds a threshold (denoted as a threshold $Th_{ATI}$) obtained by subtracting a predetermined margin from an upper limit value of a range in which expected data can be acquired.

FIG. 6 is a view illustrating an example of a method of managing the ATI count by the controller 30 according to the embodiment.

According to the example illustrated in FIG. 6, the controller 30 sets the ATI count for each of two positions different from each other in the radial direction in each of the band areas 130. More specifically, an outer diameter side ATI count $Cn_{OD}$ and an inner diameter side ATI count $Cn_{ID}$ are set for each of the band areas 130.

The outer diameter side ATI count $Cn_{OD}$ indicates the influence of ATI accumulated in data of the end (for example, the head track) on the outer diameter side of the band area 130. The inner diameter side ATI count $Cn_{ID}$ indicates the influence of ATI accumulated in the data of the end (for example, the end track) on the inner diameter side of the band area 130.

For example, in a case where writing is performed on one band area 130 adjacent to another band area 130 (denoted as a target band area) across one guard track 140, the controller 30 increments the outer diameter side ATI count $Cn_{OD}$ of the target band area by a predetermined value. In a case where writing is performed on the other band area 130 adjacent to the target band area on the inner diameter side across one guard track 140, the controller 30 increments the inner diameter side ATI count $Cn_{ID}$ of the target band area by a predetermined value.

Note that the influence of ATI on data may vary depending on a distance from the position where writing is performed. Therefore, in a case where a width of the target band area in the radial direction is narrow, data at both ends of the target band area in the radial direction may be affected by ATI due to the writing in the adjacent band area 130. In such a case, the controller 30 increments both the outer diameter side ATI count $Cn_{OD}$ and the inner diameter side ATI count $Cn_{ID}$ of the target band area in response to the writing in the adjacent band area 130. However, an increment amount of each of the ATI counts varies depending on the distance from the band area 130 where the writing is performed.

The controller 30 stores a table illustrated in FIG. 6 in, for example, the RAM 27, and updates the ATI count in the table per writing in units of the band areas 130 with respect to the magnetic disk 11. When the power is turned off, the controller 30 saves the table in a nonvolatile storage area such as the magnetic disk 11 or the FROM 28. Then, at the time of activation, the controller 30 loads the table saved in the nonvolatile storage area into the RAM 27.

A technique to be compared with the embodiment will be described. The technique to be compared with the embodiment in the following description will be denoted as a first comparative example.

In the first comparative example, in an ATI refresh operation, rewriting is executed in units of band areas. Thus, in the ATI refresh operation, the entire data written in a band area is read, and the entire read data is written in the band area. As described above, since the rewriting is performed in units of band areas, a lot of time is required for the ATI refresh operation. As a result, when the ATI refresh operation is started, the performance of response to a host may be significantly deteriorated.

According to the embodiment, the controller 30 is configured to be capable of executing rewriting partly on one band area 130. Specifically, the controller 30 executes rewriting in one part of one band area 130 and refrains from executing rewriting in the other part of the one band area 130. Since the amount of data to be rewritten is smaller than that in the first comparative example, the time required for the ATI refresh operation is reduced as compared with the first comparative example. After the rewriting in one part of one band area 130, the controller 30 manages, as a new band area 130, each of the one part to which the rewriting has been executed and the remaining part refrained from the rewriting.

Figure 7:
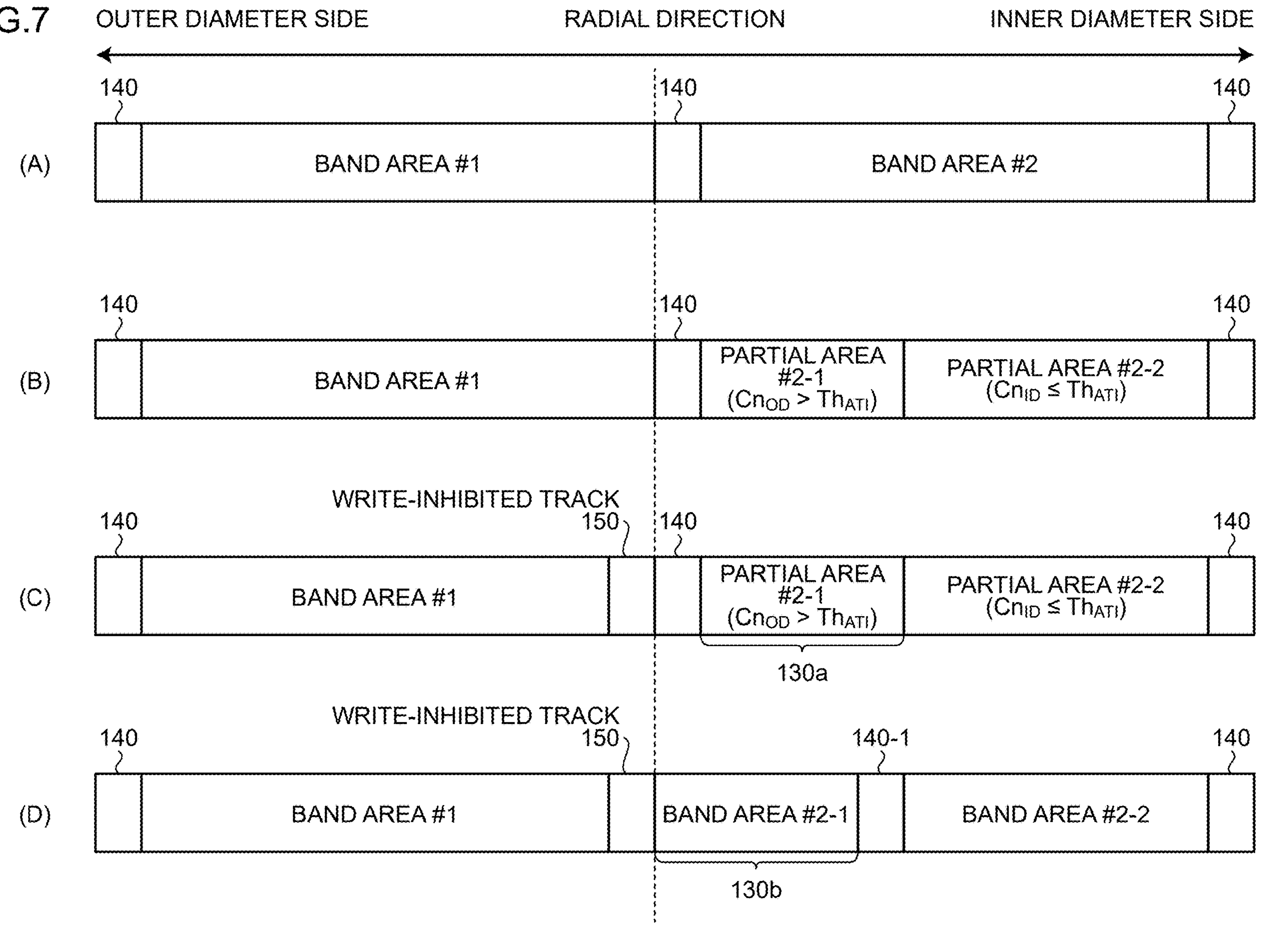
FIG. 7 is a view for describing an ATI refresh operation according to the embodiment.

FIGS. 7 and 8 are views for describing the ATI refresh operation according to the embodiment.

Part (A) of FIG. 7 illustrates a band area #1 and a band area #2 as two band areas 130 adjacent in the radial direction across one guard track 140.

For example, when the outer diameter side ATI count $Cn_{OD}$ of the band area #2 exceeds the threshold $Th_{ATI}$ and the inner diameter side ATI count $Cn_{ID}$ of the band area #2 does not exceed the threshold $Th_{ATI}$ by writing in the band area #1, the controller 30 divides the band area #2 into a partial area on the outer diameter side and a partial area on the inner diameter side as illustrated in Part (B) of FIG. 7. The partial area on the outer diameter side is denoted as a partial area #2-1. The partial area on the inner diameter side is denoted as a partial area #2-2.

Next, as illustrated in Part (C) of FIG. 7, the controller 30 sets an end track of the band area #1, which is the track 41 adjacent to the partial area #2-1 of a plurality of the tracks 41 of the band area #1 across one guard track 140, as a write-inhibited track 150.

Next, the controller 30 executes rewriting of data of the partial area #2-1 as follows. The controller 30 first reads the entire data from the partial area #2-1. The entire data read from the partial area #2-1 is temporarily stored in, for example, the RAM 27, the buffer memory 29, or the like. Then, as illustrated in Part (D) of FIG. 7, the controller 30 writes, with the SMR scheme, the entire data read from the partial area #2-1 in an area 130*b* adjacent to the write-inhibited track 150 on the inner diameter side. The area 130*b* is constituted by the tracks 41 that are continuous in the radial direction and include, as a head track, the track 41 that was set as the guard track 140.

The position of an area 130*b* is equal to a position shifted by one track 41 toward the outer diameter side with reference to the area 130*a* used as the partial area #2-1 illustrated in Part (C) FIG. 7. The area 130*b* can be regarded as an area that includes a part of the area 130*a* and is spaced from the band area #2-2 by one track 41. The controller 30 sets this one track 41 located between the area 130*b* and the band area #2-2 as a new guard track 140-1.

The write-inhibited track 150 and the new guard track 140-1 are arranged outside both ends of the area 130*b*. Therefore, the controller 30 can perform writing with the SMR scheme in a unit of the area 130*b* without destroying data written in an area adjacent to the area 130*b*.

In addition, the guard tracks 140 and 140-1 are arranged outside both ends of the partial area #2-2. Therefore, the controller 30 can perform writing with the SMR scheme in a unit of the partial area #2-2.

The controller 30 manages the area 130*b* as one band area #2-1 of two band areas 130 divided from the band area #2, and manages the partial area #2-2 as the other band area #2-2 of the two band areas 130.

Note that the controller 30 allocates a substitutional area of the write-inhibited track 150 to the media cache area 120 when the end track of the band area #1 is set as the write-inhibited track 150. Then, the controller 30 saves data written in the end track of the band area #1 to the substitutional area allocated to the media cache area 120. Hereinafter, the substitutional area of the write-inhibited track 150 allocated to the media cache area 120 will be denoted as a substitute area.

Another technique to be compared with the embodiment will be described. The technique to be compared with the embodiment in the following description will be denoted as a second comparative example.

According to the second comparative example, rewriting is executed in units of band areas in an ATI refresh operation, which is similar to the first comparative example. Further, when an ATI count of a certain band area exceeds a threshold, writing is inhibited in a range in the radial direction in which data of the band area is affected by ATI. Thus, a wide write-inhibited area is set in a band area adjacent to the band area of which the ATI count exceeds the threshold. Data designated to be written in the write-inhibited area is written in a media cache area instead of the area. Then, when the ATI refresh operation is completed, the write inhibition for the area is canceled.

As described above, according to the second comparative example, the media cache area is used as a substitutional area for a large area in which writing is inhibited. Therefore, it is necessary to allocate an area with a relatively large size as the media cache area, and the size of an allowable storage area for storing data from a host is reduced.

In contrast, according to the embodiment, since the time required for the ATI refresh operation is little, rewriting is executed immediately when the ATI count exceeds the threshold $Th_{ATI}$. Therefore, it is not necessary to set a wide write-inhibited area in an adjacent band area. As compared with the second comparative example, the size of an area allocated as the media cache area 120 can be suppressed, and the size of a storage area in which data from the host can be stored can be increased.

FIG. 7 illustrates an example in which the controller 30 performs rewriting partly on one band area 130 and divides the one band area 130 into two. The band areas 130 newly generated by the division may be further divided into two.

Part (E) of FIG. 8 illustrates a state after the band area #2 is divided into the band area #2-1 and the band area #2-2.

For example, when the outer diameter side ATI count $Cn_{OD}$ of the band area #2-2 exceeds the threshold $Th_{ATI}$ and the inner diameter side ATI count $Cn_{ID}$ of the band area #2-2 does not exceed the threshold $Th_{ATI}$, the controller 30 divides the band area #2-2 into a partial area on the outer diameter side and a partial area on the inner diameter side as illustrated in Part (F) of FIG. 8. The partial area on the outer diameter side is denoted as a partial area #2-2-1. The partial area on the inner diameter side is denoted as a partial area #2-2-2.

Next, as illustrated in Part (G) of FIG. 8, the controller 30 sets an end track of the band area #2-1, which is the track 41 adjacent to the partial area #2-2-1 among the tracks 41 of the band area #2-1 across one guard track 140-1, as the write-inhibited track 150.

Next, the controller 30 executes rewriting of data of the partial area #2-2-1 as follows. The controller 30 first reads the entire data from the partial area #2-2-1. The entire data read from the partial area #2-2-1 is temporarily stored in the RAM 27, the buffer memory 29, or the like. Then, as illustrated in Part (H) of FIG. 8, the controller 30 writes, with the SMR scheme, the entire data read from the partial area #2-2-1 in an area 130*c* constituted by the tracks 41 that are continuous in the radial direction and include the track 41 as a head track that was set as the guard track 140-1. Then, the controller 30 manages the area 130*c* as a new band area #2-2-1 and manages the partial area #2-2-2 as a new band area #2-2-2.

As described above, even the band area 130 generated by partial rewriting can be divided.

Next, an operation of the magnetic disk device 1 according to the embodiment will be described. FIG. 9 is a view illustrating an example of a write operation according to the embodiment.

The controller 30 executes writing in a certain band area 130 by using the magnetic head 22 (step S101). In the description of FIG. 9, the band area 130 where writing has been executed by the process of step S101 is denoted as a write target band area 130.

In response to the writing in the write target band area 130, the controller 30 increments one or more ATI counts of one or more band areas 130 adjacent to the write target band area 130 (step S102). In step S102, the controller 30 determines each of the ATI counts to be incremented and the increment amount based on a distance between the position where the ATI count is set and the write target band area 130.

The controller 30 sets two ATI counts of the write target band area 130 to zero (step S103). Then, the write operation ends.

FIG. 10 is a view illustrating an example of the ATI refresh operation according to the embodiment. In the drawing, a series of operations executed for one band area 130 will be described. The series of operations illustrated in the drawing is executed for each of all the band areas 130 provided in the magnetic disk 11. In the description of the drawing, one band area 130 of interest is denoted as a target band area.

The controller 30 determines whether or not either one of two ATI counts of the target band area exceeds the threshold $Th_{ATI}$ (step S201). When neither of the two ATI counts of the target band area exceeds the threshold $Th_{ATI}$ (step S201: No), the controller 30 executes the process of step S201 again.

When either one of the two ATI counts of the target band area exceeds the threshold $Th_{ATI}$ (step S201: Yes), the controller 30 starts the ATI refresh operation. In the ATI refresh operation, the controller 30 divides the target band area into two partial areas (step S202). One of the two partial areas located on the outer diameter side obtained by the division is denoted as a first partial area, and the other partial area located on the inner diameter side is denoted as a second partial area.

Note that a method of determining a division position of the target band area is not limited to a specific method. In one example, the controller 30 sets the center position of a width of the target band area in the radial direction, as the division position of the target band area.

In another example, when the outer diameter side ATI count $Cn_{OD}$ of the target band area exceeds the threshold $Th_{ATI}$, the controller 30 determines the division position such that a predetermined number of the tracks 41 continuous in the radial direction on the outermost diameter side of the target band area become the first partial area, and all the remaining tracks 41 of the target band area become the second partial area. When the inner diameter side ATI count $Cn_{ID}$ of the target band area exceeds the threshold $Th_{ATI}$, the controller 30 determines the division position such that a predetermined number of the tracks 41 continuous in the radial direction on the innermost diameter side of the target band area become the second partial area and all the remaining tracks 41 of the target band area become the first partial area.

In still another example, the controller 30 determines the division position based on a ratio between the outer diameter side ATI count $Cn_{OD}$ of the target band area and the inner diameter side ATI count $Cn_{ID}$ of the target band area.

After the process of step S202, the controller 30 determines whether or not the ATI count exceeding the threshold $Th_{ATI}$ is the outer diameter side ATI count $Cn_{OD}$(step S203).

When the ATI count exceeding the threshold $Th_{ATI}$ is the outer diameter side ATI count $Cn_{OD}$ (step S203: Yes), the controller 30 sets a write-inhibited track in the band area 130 adjacent to the first partial area across the write-inhibited track or a guard track (step S204). In step S204, an end track of the band area 130 adjacent to the target band area on the outer diameter side is set as a new write-inhibited track.

The controller 30 allocates a substitute area to be used as a substitutional area of the new write-inhibited track to the media cache area 120 (step S205).

Next, the controller 30 sets a guard track along a boundary of the second partial area on the outer diameter side of the second partial area (step S206). The track 41 on the outermost diameter side of the first partial area is set as the guard track.

The controller 30 reads the entire data from the first partial area (step S207). Then, the controller 30 writes the entire data read from the first partial area in an area sandwiched between the new write-inhibited track set in step S204 and the new guard track set in step S206 with the SMR scheme (step S208). Specifically, in step S208, the controller 30 writes, with the SMR scheme, the entire data read from the first partial area in the tracks 41 that are continuous in the radial direction and include, as a head track, the track 41 that was once set as the guard track adjacent to the new write-inhibited track on the inner diameter side.

After step S208, the area sandwiched between the new write-inhibited track set in step S204 and the new guard track set in step S206 is set as one of two new band areas 130 generated by the division of the target band area. This area is denoted as a first band area. In addition, the second partial area is set as another one of the two new band areas 130. The second partial area is denoted as a second band area.

The controller 30 generates two ATI counts (that is, the outer diameter side ATI count $Cn_{OD}$ and the inner diameter side ATI count $Cn_{ID}$) for each of the first band area and the second band area (step S209).

A method of setting values of the two ATI counts of each of the band areas generated in step S209 is not limited to a specific method. In one example, the controller 30 sets the two ATI counts of the first band area to zero. The controller 30 sets the outer diameter side ATI count $Cn_{OD}$ of the second band area to zero or a value responding to the writing performed in step S208. The controller 30 sets the inner diameter side ATI count $Cn_{ID}$ of the second band area to the same value as the inner diameter side ATI count $Cn_{ID}$ of the target band area.

The controller 30 deletes the two ATI counts of the target band area (step S210), and the ATI refresh operation is completed. Then, the controller 30 executes the process of step S201 again.

When the ATI count exceeding the threshold $Th_{ATI}$ is not the outer diameter side ATI count $Cn_{OD}$ (step S203: No), that is, when the ATI count exceeding the threshold $Th_{ATI}$ is the inner diameter side ATI count $Cn_{ID}$, the controller 30 sets the write-inhibited track in the band area 130 adjacent to the second partial area across the write-inhibited track or the guard track (step S211). In step S211, the head track of the band area 130 adjacent to the target band area on the inner diameter side is set as a new write-inhibited track.

The controller 30 allocates a substitute area to be used as a substitutional area of the new write-inhibited track to the media cache area 120 (step S212).

Next, the controller 30 sets a guard track along a boundary of the first partial area on the inner diameter side of the first partial area (step S213). Thus, the track 41 on the innermost diameter side of the second partial area is set as the guard track.

The controller 30 reads the entire data from the second partial area (step S214). Then, the controller 30 writes the entire data read from the second partial area in an area sandwiched between the new write-inhibited track set in step S211 and the new guard track set in step S213 with the SMR scheme (S215).

After step S215, the area sandwiched by the new write-inhibited track set in step S211 and the new guard track set in step S213 is set as one of two new band areas 130 generated by the division of the target band area. This area is denoted as a second band area. In addition, the first partial area is set as another one of the two band areas 130. The first partial area is denoted as a first band area.

The controller 30 generates two ATI counts (that is, the outer diameter side ATI count $Cn_{OD}$ and the inner diameter side ATI count $Cn_{ID}$) for each of the first band area and the second band area (step S216).

A method of setting values of the two ATI counts of each of the band areas set in step S216 is not limited to a specific method. In one example, the controller 30 sets the two ATI counts of the second band area to zero. The controller 30 sets the inner diameter side ATI count $Cn_{ID}$ of the first band area to zero or a value responding to the writing performed in step S215. The controller 30 sets the outer diameter side ATI count $Cn_{OD}$ of the first band area to the same value as the outer diameter side ATI count $Cn_{OD}$ of the target band area.

After the process of step S216, the controller 30 executes the process of step S210.

In the description of the embodiment described above, a group excluding the track 41 used as the media cache area 120 out of a group of the tracks 41 provided on the recording surface 100 is an example of the first tracks. For example, the band area 130 described as the target band area in FIG. 10 is an example of the second tracks continuous in the radial direction. The ATI refresh operation is an example of the first operation. A partial area set as a rewrite target in the target band area described in FIG. 10 is an example of the third tracks. A partial area which is not a rewrite target in the target band area described in FIG. 10 is an example of the fourth tracks.

The area 130*b* illustrated in FIG. 7 and the area 130*c* illustrated in FIG. 8 are examples of the fifth tracks. In the description illustrated in FIG. 10, the first band area described in steps S208 and S209 and the second band area described in steps S215 and S216 correspond to the fifth tracks.

The band area 130 adjacent to the partial area set as the rewrite target across the guard track 140 or the write-inhibited track 150 is an example of the sixth tracks. The guard track 140 or the write-inhibited track 150 between the partial area set as the rewrite target and the adjacent band area 130 is an example of a seventh track. The track 41 closest to the partial area of the band area 130 adjacent to the partial area set as the rewrite target across the guard track 140 or the write-inhibited track 150 is an example of an eighth track.

An area of the recording surface 100 excluding the media cache area 120, that is, an area in which the band area 130, the guard track 140, the write-inhibited track 150, and the like are provided is an example of a first storage area. The media cache area 120 is an example of a second storage area.

As described above, according to the embodiment, the controller 30 calculates the degree of influence of ATI accumulated in the data written in the target band area (an example of the second tracks), and executes the ATI refresh operation (an example of the first operation) in accordance with the degree. In the ATI refresh operation, the controller 30 executes rewriting of data written in a partial area (an example of the third tracks) including the continuous tracks 41 located on the outermost diameter side or the innermost diameter side in the target band area (an example of the second tracks), and refrains from rewriting of data written in the other partial area (an example of the fourth tracks) constituted by all tracks other than the above-noted continuous tracks 41 in the target band area (an example of the second tracks).

Therefore, the time required for the ATI refresh operation is reduced as compared with the first comparative example. The magnetic disk device 1 can suitably execute the ATI refresh operation.

In addition, according to the embodiment, in the ATI refresh operation, the controller 30 reads the entire data from the partial area (an example of the third tracks) which is the rewrite target. Then, the controller 30 writes the entire data read from the partial area which is the rewrite target to an area (an example of the fifth tracks) spaced from the track 41 set as a new guard track in the partial area which is not the rewrite target.

Therefore, the controller 30 can write the entire data read from the partial area which is the rewrite target with the SMR scheme without destroying the data written in the partial area which is not the rewrite target.

In addition, according to the embodiment, in a case where the band area 130 (an example of the sixth tracks) spaced from the target band area (an example of the second tracks) by the guard track or the write-inhibited track (the guard track or the write-inhibited track is an example of the seventh track) is adjacent to the partial area which is the rewrite target across the guard track or the write-inhibited track (the guard track or the write-inhibited track is an example of the seventh track), the controller 30 inhibits writing in the track 41 closest to the partial area which is the rewrite target among the sixth tracks.

Therefore, the controller 30 can write the entire data read from the partial area which is the rewrite target with the SMR scheme.

Note that one guard track 140 is set between the band areas 130 adjacent to each other in the example described above. The number of the guard tracks 140 set between the band areas 130 adjacent to each other is not limited to one. Similarly, one track 41 in the adjacent band area 130 is set as the write-inhibited track at the time of rewriting in the partial area. The number set as the write-inhibited track is not limited to one. The controller 30 may set N (N is an integer of two or more) tracks 41 continuous in the radial direction as the guard tracks 140, and set N tracks 41 continuous in the radial direction in the adjacent band area 130 as the write-inhibited tracks.

In addition, according to the embodiment, the controller 30 writes, to the media cache area 120, the data to be written in the track 41 in which writing is inhibited.

In addition, according to the embodiment, the controller 30 calculates the outer diameter side ATI count $Cn_{OD}$ and the inner diameter side ATI count $Cn_{ID}$ for the target band area (an example of the second tracks). Then, the controller 30 selects a partial area which is the rewrite target based on the outer diameter side ATI count $Cn_{OD}$ and the inner diameter side ATI count $Cn_{ID}$.

More specifically, when the outer diameter side ATI count $Cn_{OD}$ exceeds the threshold $Th_{ATI}$, the controller 30 selects a partial block on the outer diameter side in the target band area (an example of the second tracks) as a rewrite target. When the inner diameter side ATI count $Cn_{ID}$ exceeds the threshold $Th_{ATI}$, the controller 30 selects a partial block on the inner diameter side in the target band area (an example of the second tracks) as a rewrite target.

Therefore, it is possible to prevent reading from being difficult due to the influence of ATI without rewriting the entire area of the target band area.

Note that, in the example described above, the ATI count is set for each position of the end (for example, the head track) on the outer diameter side of the band area 130 and the end (for example, the end track) on the inner diameter side of the band area 130. As long as the controller 30 is configured to calculate, for each of the band areas 130, the ATI count for at least two different positions in the radial direction, positions at which the ATI count is calculated and the number of positions at which the ATI count is calculated are set in any manner.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk on which first tracks are provided;
a magnetic head; and
a controller configured to
write data in second tracks with a shingled magnetic recording (SMR) scheme by using the magnetic head, the second tracks being tracks continuous in a radial direction among the first tracks,
calculate a degree of influence of adjacent track interference (ATI) accumulated in first data being the data written in the second tracks, and
execute a first operation in accordance with the degree of influence of ATI, the first operation being an operation of
rewriting second data out of the first data, the second data being written in third tracks among the second tracks, the third tracks being continuous in the radial direction and located on an outermost diameter side or an innermost diameter side of the second tracks, and
refraining from rewriting data out of the first data written in fourth tracks, the fourth tracks being tracks continuous in the radial direction and being all tracks other than the third tracks among the second tracks.

2. The magnetic disk device according to claim 1, wherein the controller is configured to, in the first operation,
read the second data from the third tracks, and
write, with the SMR scheme, the second data read from the third tracks in fifth tracks being tracks continuous in the radial direction, the fifth tracks including some of the third tracks and being spaced from the fourth tracks by a first number of tracks.

3. The magnetic disk device according to claim 2, wherein
the controller is configured to, before the first operation, write data with the SMR scheme in sixth tracks being tracks continuous in the radial direction among the first tracks,
the sixth tracks are spaced from the second tracks by the first number of seventh tracks, and
the controller is configured to, when the third tracks are adjacent to the sixth tracks across the first number of the seventh tracks in the first operation, inhibit writing in the first number of eighth tracks closest to the third tracks among the sixth tracks.

4. The magnetic disk device according to claim 3, wherein
the magnetic disk includes a first storage area provided with the first tracks and a second storage area different from the first storage area, and
the controller is configured to write, in the second storage area, data to be written in the first number of the eighth tracks.

5. The magnetic disk device according to claim 1, wherein the controller is configured to
calculate the degree of influence of ATI for each of a first position and a second position, the first position being located in a range in the radial direction where the second tracks are provided, the second position being located on an inner diameter side of the first position in the range, and
select the third tracks from among the second tracks based on the degree of influence of ATI at the first position and the degree of influence of ATI at the second position.

6. The magnetic disk device according to claim 2, wherein the controller is configured to
calculate the degree of influence of ATI for each of a first position and a second position, the first position being located in a range in the radial direction where the second tracks are provided, the second position being located on an inner diameter side of the first position in the range, and
select the third tracks from among the second tracks based on the degree of influence of ATI at the first position and the degree of influence of ATI at the second position.

7. The magnetic disk device according to claim 3, wherein the controller is configured to calculate the degree of influence of ATI for each of a first position and a second position, the first position being located in a range in the radial direction where the second tracks are provided, the second position being located on an inner diameter side of the first position in the range, and select the third tracks from among the second tracks based on the degree of influence of ATI at the first position and the degree of influence of ATI at the second position.

8. The magnetic disk device according to claim 4, wherein the controller is configured to calculate the degree of influence of ATI for each of a first position and a second position, the first position being located in a range in the radial direction where the second tracks are provided, the second position being located on an inner diameter side of the first position in the range, and select the third tracks from among the second tracks based on the degree of influence of ATI at the first position and the degree of influence of ATI at the second position.

9. The magnetic disk device according to claim 5, wherein the controller is configured to compare, with a threshold, each of the degree of influence of ATI at the first position and the degree at the second position, select, as the third tracks, tracks continuous in the radial direction on the outermost diameter side from among the second tracks when the degree of influence of ATI at the first position exceeds the threshold, and select, as the third tracks, tracks continuous in the radial direction on the innermost diameter side from among the second tracks when the degree of influence of ATI at the second position exceeds the threshold.

10. The magnetic disk device according to claim 6, wherein the controller is configured to compare, with a threshold, each of the degree of influence of ATI at the first position and the degree at the second position, select, as the third tracks, tracks continuous in the radial direction on the outermost diameter side from among the second tracks when the degree of influence of ATI at the first position exceeds the threshold, and select, as the third tracks, tracks continuous in the radial direction on the innermost diameter side from among the second tracks when the degree of influence of ATI at the second position exceeds the threshold.

11. The magnetic disk device according to claim 7, wherein the controller is configured to compare, with a threshold, each of the degree of influence of ATI at the first position and the degree at the second position, select, as the third tracks, tracks continuous in the radial direction on the outermost diameter side from among the second tracks when the degree of influence of ATI at the first position exceeds the threshold, and select, as the third tracks, tracks continuous in the radial direction on the innermost diameter side from among the second tracks when the degree of influence of ATI at the second position exceeds the threshold.

12. The magnetic disk device according to claim 8, wherein the controller is configured to compare, with a threshold, each of the degree of influence of ATI at the first position and the degree at the second position, select, as the third tracks, tracks continuous in the radial direction on the outermost diameter side from among the second tracks when the degree of influence of ATI at the first position exceeds the threshold, and select, as the third tracks, tracks continuous in the radial direction on the innermost diameter side from among the second tracks when the degree of influence of ATI at the second position exceeds the threshold.

13. A method comprising:

writing data in second tracks with a shingled magnetic recording (SMR) scheme by using a magnetic head, the second tracks being tracks continuous in a radial direction among first tracks provided on a magnetic disk;

calculating a degree of influence of adjacent track interference (ATI) accumulated in first data being the data written in the second tracks; and executing a first operation in accordance with the degree of influence of ATI, the first operation being an operation of rewriting second data out of the first data, the second data being written in third tracks among the second tracks, the third tracks being continuous in the radial direction and located on an outermost diameter side or an innermost diameter side of the second tracks, and refraining from rewriting data out of the first data written in fourth tracks, the fourth tracks being tracks continuous in the radial direction and being all tracks other than the third tracks among the second tracks.

14. The method according to claim 13, wherein the first operation includes reading the second data from the third tracks, and writing, with the SMR scheme, the second data read from the third tracks in fifth tracks being tracks continuous in the radial direction, the fifth tracks including some of the third tracks and being spaced from the fourth tracks by a first number of tracks.

15. The method according to claim 13, further comprising:

calculating the degree of influence of ATI for each of a first position and a second position, the first position being located in a range in the radial direction where the second tracks are provided, the second position being located on an inner diameter side of the first position in the range; and selecting the third tracks from among the second tracks based on the degree of influence of ATI at the first position and the degree of influence of ATI at the second position.

16. The method according to claim 14, further comprising:

calculating the degree of influence of ATI for each of a first position and a second position, the first position being located in a range in the radial direction where the second tracks are provided, the second position being located on an inner diameter side of the first position in the range; and selecting the third tracks from among the second tracks based on the degree of influence of ATI at the first position and the degree of influence of ATI at the second position.

17. The method according to claim 15, further comprising:

comparing, with a threshold, each of the degree of influence of ATI at the first position and the degree at the second position;

selecting, as the third tracks, tracks continuous in the radial direction on the outermost diameter side from among the second tracks when the degree of influence of ATI at the first position exceeds the threshold; and selecting, as the third tracks, tracks continuous in the radial direction on the innermost diameter side from among the second tracks when the degree of influence of ATI at the second position exceeds the threshold.

18. The method according to claim 16, further comprising:

comparing, with a threshold, each of the degree of influence of ATI at the first position and the degree at the second position;

selecting, as the third tracks, tracks continuous in the radial direction on the outermost diameter side from among the second tracks when the degree of influence of ATI at the first position exceeds the threshold; and selecting, as the third tracks, tracks continuous in the radial direction on the innermost diameter side from among the second tracks when the degree of influence of ATI at the second position exceeds the threshold.

* * * * *